United States Patent [19]

Swanson

[11] 3,900,840
[45] Aug. 19, 1975

[54] WARNING DEVICE FOR BRAKE SYSTEMS AND THE LIKE

[75] Inventor: Kenneth B. Swanson, Bannister, Mich.

[73] Assignee: Midland-Ross Corporation, Cleveland, Ohio

[22] Filed: Feb. 22, 1974

[21] Appl. No.: 444,765

[52] U.S. Cl. .................................. 340/242; 303/6 C
[51] Int. Cl.... G08b 21/00; B60t 11/34; B60t 17/22
[58] Field of Search....... 340/242, 52 C; 188/151 A; 303/6 C

[56] References Cited
UNITED STATES PATENTS

| | | | |
|---|---|---|---|
| 3,700,286 | 10/1972 | Bueler | 340/52 C X |
| 3,717,382 | 2/1973 | Ayers, Jr. | 340/52 C X |

*Primary Examiner*—John W. Caldwell
*Assistant Examiner*—Daniel Myer
*Attorney, Agent, or Firm*—Frank J. Nawalanic

[57] ABSTRACT

A brake failure warning device is provided for use in a split or dual brake system. The device includes a shuttle disposed within a stepped bore which is maintained in a centered position when pressure in both systems are approximately equal and axially shifts to a second position to actuate a warning signal when failure occurs in one of the systems. The shuttle is supported within the bore in a sealed, failsafe manner which positively and automatically repositions the shuttle in its centered position when pressure is restored in the failed system.

1 Claim, 6 Drawing Figures

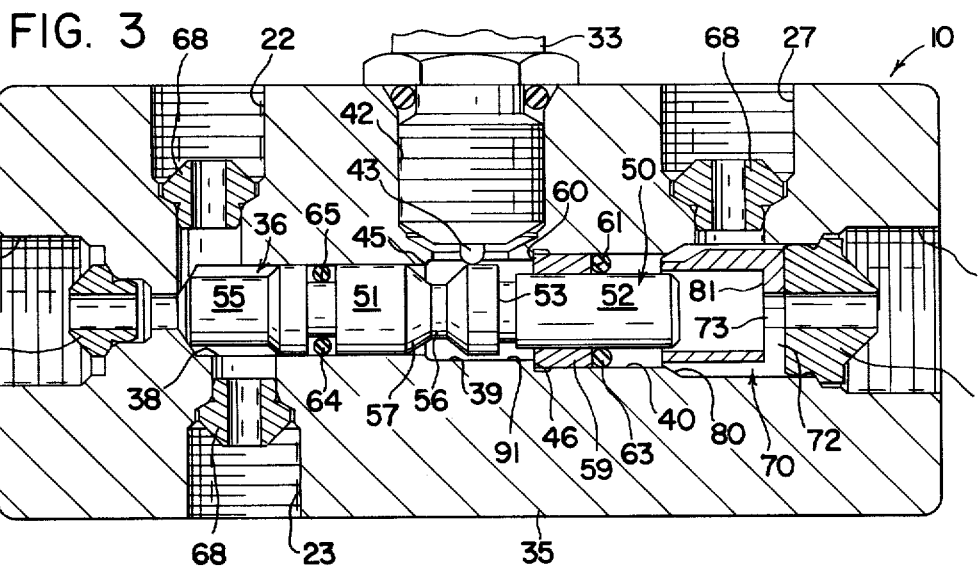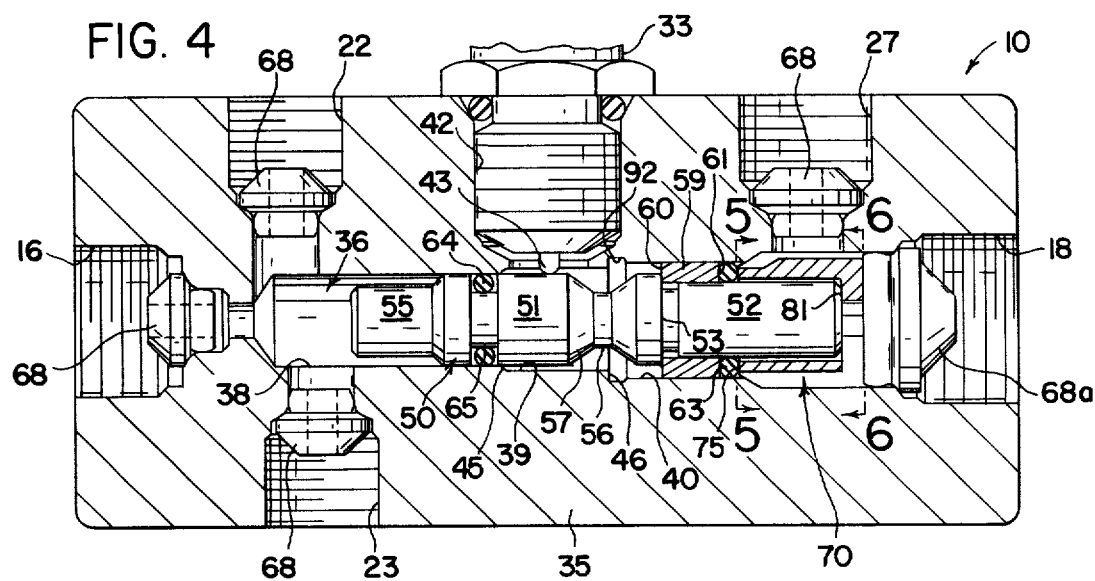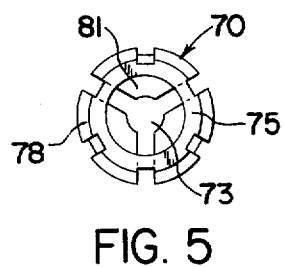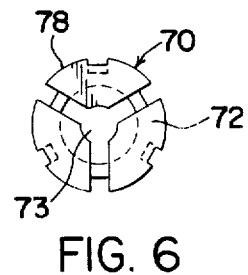

WARNING DEVICE FOR BRAKE SYSTEMS AND THE LIKE

This invention relates generally to a warning device and, more particularly, to a pressure sensitive device which senses differential pressures between first and second fluid systems.

The invention is particularly applicable to a brake failure warning device used in split or dual brake systems on automotive vehicles and the like and will be described with particular reference thereto. However, it will be appreciated by those skilled in the art that the invention may have broader applications and can be applied as a sensing or control unit in any instance where it is desired to maintain two different fluid flow systems at equal pressures.

Heretofore, a number of warning indicators have been provided in automotive vehicles employing dual or split brake systems to actuate a warning light in the instrument panel of the vehicle when a failure occurs in one of the brake systems. More recently, federal safety regulations have required that such warning devices remain "on" even though the vehicle operator removes his foot from the brake and, furthermore, that such warning devices be automatically deactivated, without disassembly, when the failed brake system is repaired. One of the few known warning switches which meet this criteria is set forth in U.S. Pat. No. 3,772,672 and this invention should properly be viewed as an improvement of the device disclosed therein.

Briefly, the device disclosed in the U.S. Pat. No. 3,772,672 utilized a shuttle-piston having dissimilarly-sized end portions, each end portion being in fluid communication with one of the hydraulic brake systems. The difference in piston area produced a biasing force at one piston end to axially shift the piston into contact with a sleeve receiving the opposite end portion which in turn, because of its area, biased the piston in the opposite direction until the sleeve contacted a stop whereby the piston was maintained in a centered position. When a pressure drop occurred in either system with respect to the other, the press force still exerted at one piston end axially shifted the piston to actuate the switch. Repair of the system resulted in equal pressures acting over differential areas to shift the piston back to its centered position. While the geometries of the arrangement are sound, in actual practice the arrangement disclosed may not function in such a manner.

More particularly, the piston was supported along most of its length by the smaller portion of a two-step bore housing the piston and the sleeve. Only one seal was provided at the sleeve to prevent fluid communication between the two brake systems. While the seal properly functioned when the switch was in its neutral, centered position, clearance tolerances and spaces between the larger diameter piston portion and small diameter bore portion collected fluid. After a failure occurred and the piston axially shifted to another position, new clearances were formed from areas normally associated with the sleeve and fluid was drawn therein. Upon reapplication of the brakes after repair had been made, fluid in such clearances was pressurized, especially if a steady application of the brakes were made to simulate a static pressure condition. The fluid thus trapped and to some extent pressurized in these clearances materially affected the ability of the piston to recenter itself as such clearances must be closed when the piston moves into its centered position. It is felt in some instances that the piston could be prevented from recentering itself because of the trapped fluid.

It is thus an object of the subject invention to provide a shuttle-piston arrangement in a failure warning device that is supported and sealed in such a manner to automatically insure positive centering of the piston when equal pressures exist in first and second fluid-pressurized systems associated therewith.

This object along with other features of the subject invention is achieved in a failure warning device for indicating a pressure differential between first and second fluid-pressurized systems which is similar to that disclosed above. In accordance with the invention, however, the bore within the device's housing is cylindrically stepped into successively larger first, second and third areas. The shuttle-piston which is cylindrically stepped from a small diameter portion to a larger portion is supported only within the first and third bore portions by a first seal adjacent the sleeve (first) and portions by a first seal adjacent the sleeve (first) and small piston portion and a second seal in the large diameter piston portion. The seals, in effect, suspend the shuttle-piston within the bore at two axially spaced points independent of the attitude that the shuttle-piston may assume within the bore. Importantly, fluid is prevented from communicating not only between the first and second systems but is also prevented from leaking into the clearance between the piston and the second bore portion. The absence of fluid in this clearance positively assures that the shuttle-piston will always center itself when equal pressures are exerted in the first and second systems.

In accordance with another feature of the subject invention, the device is materially simplified in its construction by a solid stop mechanism which restrains the piston when it is shifted from its centered position to one of its actuated positions. That is, one of the fluid systems is in communication with the device by an inlet port axially aligned with the central bore and an outlet port in the device angularly disposed in relation to the inlet port. A cylindrically-hollowed, open-ended retainer has a base surface at one of its ends abutting a stop defined by the inlet port and one of the piston ends abuts the interior of this base to provide a solid stop for the piston when in the afore-mentioned actuated position. The opposite axial end of the retainer is solidly positioned within the central bore by a series of circumferentially extending flutes which provide fluid communication between the inlet port, the bore and the outlet port. Additionally, the axial end face surface of the retainer thus supported by the flutes serves to prevent movement of the first seal into a position which would permit fluid communication between the first and second pressurized systems.

It is thus another object of the subject invention to provide in a failure warning device employing a shuttle-piston arrangement, a stop mechanism for such shuttle-piston which materially simplifies and reduces the cost of such device.

The invention may take physical form in certain parts and arrangement of parts, a preferred embodiment of which will be described in detail herein and illustrated in the accompanying drawings which form a part hereof and wherein.

Figure 2:
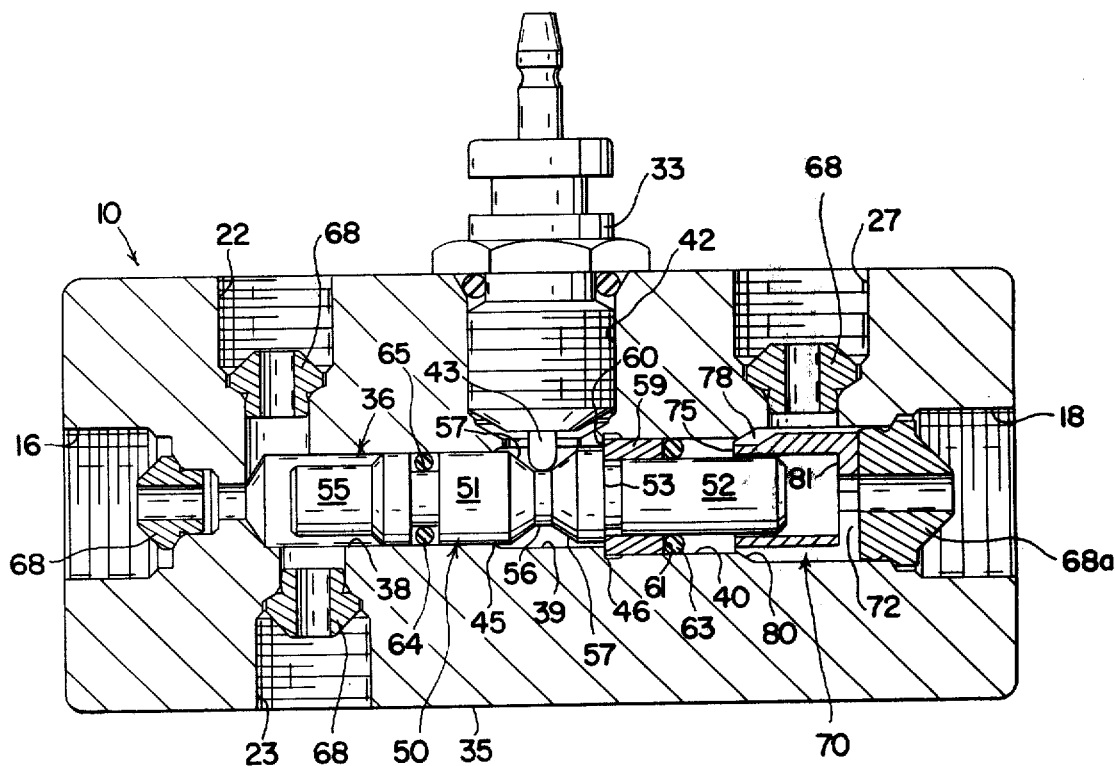
FIG. 2 is a longitudinally-sectioned view of the device illustrating the component parts in a deactuated or centered position of the device.

FIGS. 3 and 4 are views similar to FIG. 2 showing the relationship of the component parts within the device when the device is in an actuated position; and FIGS. 5 and 6 are sectioned views taken along lines 5—5 and 6—6 of FIG. 4 respectively to illustrate end views of a component part of the device.

Figure 1:
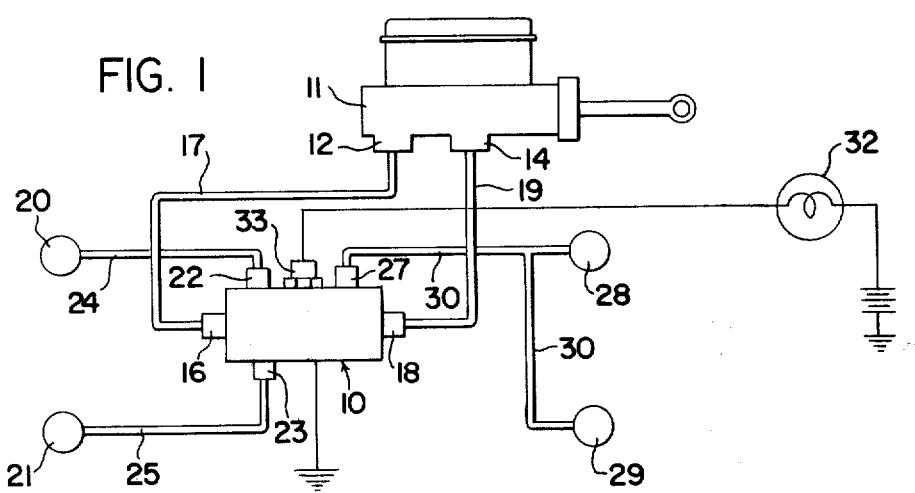
FIG. 1 is a schematic diagram illustrating a brake system employing the failure warning device of the subject invention.

Referring now to the drawings wherein the showings are for the purpose of illustrating a preferred embodiment of the invention only and not for the purpose of limiting same, there is shown in FIG. 1 a failure warning device 10 of the subject invention in fluid communication with a dual or split master cylinder 11. Dual master cylinder 11 is of a known type employing independent pressure chambers and will not be described in further detail herein. It is sufficient to note that master cylinder 11 provides a first or primary fluid system at its first outlet port 12 and a second or secondary fluid-pressurized system at its second outlet port 14. Primary system is in fluid communication from first outlet port 12 to a first inlet port 16 on brake warning device 10 through conduit 17. Secondary system is in fluid communication with brake warning device 10 at a second inlet port 18 through conduit 19. As will be apparent from the description below, fluid in the primary system is communicated from first inlet port 16 to right and left front wheel brakes 20, 21 through first and second primary outlet ports 22, 23 and conduits 24, 25 respectively. Similarly, fluid in the secondary system is communicated from second inlet port 18 to a second outlet port 27 to the rear brakes of the vehicle 28, 29 via conduit 30. Also shown in FIG. 1 is a light 32 and appropriate circuitry leading from a known detent-type switch 33 which circuitry remains open when switch 33 is deactivated and which is closed when switch 33 is in an actuated position to complete the circuit.

Referring now to FIGS. 2, 3 and 4, warning device 10 is defined by a body 35 having an axially extending bore therein, indicated generally at 36. Bore 36 is cylindrically stepped to define a first or primary bore portion 38, a second or intermediate bore portion 39 and a third or secondary bore portion 40. As shown, second bore portion 39 is larger in diameter than first bore portion 38 and third bore portion 40 is larger in diameter than second bore portion 39. First bore portion 38 is in communication with the primary fluid flow system by means of inlet and outlet ports 16, 22, 23, respectively. Similarly third bore portion 40 is in communication with secondary fluid system through inlet and outlet ports 18, 27 respectively. Second bore portion 39 is in fluid communication with a central opening 42 which threadedly receives detent-type switch 33; the actuating plunger 43 of switch 33 shown extending within second bore 39. Lines of demarcation defining junctions between first and second bore portions 38, 39 and second and third bore portions 39, 40 are shown as annular indentations 45, 46, respectively, each of which is shown relieved for ease of assembly.

Disposed within bore 36 is a cylindrically-stepped shuttle-piston 50. Shuttle-piston 50 has a large diameter or primary portion 51 disposed within first bore 38 and a smaller or secondary portion 52 disposed within third bore portion 40. A line of demarcation between large and small diameter piston portions 51, 52 is defined by an annular shoulder 53 at the juncture of the piston portion. Contiguous with and extending from the end of small diameter piston portion 52 is a cylindrical primary stop 55 portion. The large diameter piston portion 51 adjacent annular shoulder 53 is necked down in a V-shaped configuration to permit actuating plunger 43 of switch 33 to rest at the apex thereof when shuttle-piston 50 is in a centered position. More particularly, the V-shaped configuration is defined by a relatively small cylindrical surface 56 from which frusto-conical surfaces 57 extend from the axial ends thereof and blend, respectively, into large diameter portion 51.

A reset sleeve member 59 receives small diameter piston portion 52 and is disposed within third bore portion 40. Sleeve member 59 has an inwardly disposed axial end 60 adapted to abut against bore indentation 46 and piston annular shoulder 53. Sleeve member 59 also has an outwardly disposed axial end 61 adapted to contact a first seal 63 compressed between third bore portion 40 and small diameter piston portion 52. A second seal 64 is similarly provided on large piston diameter portion 51. Second seal 64 is received within an annular recess 65 formed in large diameter piston portion 51 and maintained in a compressed manner between first bore portion 38 and annular recess 65.

Each of the threaded inlet and outlet ports 16, 18, 22, 23 and 27 is provided with a hollowed pressed insert 68 so that flared tubing connections (conduits) 17, 19, 24, 25 and 30 may be appropriately sealed. The insert within a secondary inlet port 18 is identified herein as 68a, and adjacent insert 68a is a stop-retainer member 70. Stop-retainer 70 is a cylindrically hollowed, open-ended retainer having a generally flat base surface 72 which abuts against the base of insert 68a and is in fluid communication therewith through a central opening 73 in base surface 72. Adjacent the opposite axial end face 75 of stop-retainer member 70, defined as an annulus, is a plurality of circumferentially-spaced flutes 78 extending radially outwardly from the outer periphery of stop-retainer member 70 to engage or wedge against a shoulder-type, annular indentation 80 in third bore portion 40. Flutes 78 thus provide a positioning stop for stop-retainer member 70 while also permitting fluid communication between second outlet port 27 and third bore portion 40. Additionally, annulus end face 75 of the retainer member serves as a stop for first seal 63 and the interior surface 81 of retainer base 72 serves as a travel stop for shuttle-piston 50 when the piston is shifted towards the right as viewed in the drawings.

The operation of failure warning device 10 will now be described by the position of the parts within the device as shown in FIGS. 2, 3 and 4 and terminology referring to part positions such as "right," "left," "down," "up," as same applies with reference to the drawings shall be used for clarity and ease of explanation only and are thus deemed to be descriptive and not limiting. As noted above, FIG. 1 shows the position of the parts of failure warning device 10 in a neutrally centered, deactivated, first position and FIGS. 2 and 3 illustrate the relation of the parts in an actuated, second position of the device.

When the first and second fluid-pressurized systems are normally operating at approximately equal pressures, shuttle-piston 50 will be in its neutrally centered, first position as shown in FIG. 1. In this position, equal pressures will exist in first and third bore portions 38, 40, respectively. Because first piston portion 51 has a greater area than second piston portion 52, shuttle-piston 50 will tend to axially shift towards the right in bore 36. This tendency of shuttle-piston 50 to move towards the right will be resisted by sleeve member 59 which, importantly, has a greater area than the differential area existing between first and second piston portions 51, 52. Thus, shuttle-piston 50 will move relative to sleeve member 59 until its annular shoulder 53 contacts sleeve axial end 60 and sleeve 59 will move relative to cylindrical bore 36 until its axial end 60 solidly contacts annular indentation 46 within the bore. In this manner, shuttle-piston 50 will be centered in the FIG. 2 position and circuitry to activate light 32 will be open because switch plunger 43 will contact cylindrical surfaces 56, i.e., the apex of the V-shaped groove. Importantly, it should be noted that when shuttle-piston 50 is in its centered position, fluid in the first pressure system is prevented from communicating with second bore 39 by second seal 64 and similarly the fluid in the first pressure system is prevented from communicating with second bore 39 by first seal 63. Furthermore, because first and second seals 63, 64 must be compressed to function, shuttle-piston 50 is supported with cylindrical bore 36 by the seals. Thus, any type of brake application within first and second systems at equal pressures which might tend to skew or change the attitude of shuttle-piston 50 within bore 36 will not result in any leakage of fluid into second bore portion 39. In contrast, the prior art device referred to above is characterized by the presence of only a first seal similar to first seal 63 of the present invention. While this seal prevents leakage between first and second systems, it should be clear that clearance between the large diameter piston portion and small diameter portion will result in fluid leakage into a clearance between the "V-shaped" piston portion and bore. Fluid communication may thus exist between the first and second systems if the attitude of the shuttle-piston should change and/or the first seal was defective or had failed.

If pressure in the first fluid system dropped below a predetermined differential value as compared to the pressure in the second fluid system (i.e., a brake failure in the primary system), pressure in the second fluid system acting against small piston diameter portion 52 would axially shift shuttle-piston 50 towards the left until piston cylindrical stop portion 55 contacted the end of bore 36 as shown in FIG. 3 and plunger 43 would be retracted to actuate light 32. With shuttle-piston 50 in its FIG. 3 position, it should be noted that a new clearance between second bore portion 39 and small diameter piston portion 52, defined at 91, has developed. However, first and second seals 63, 64 would remain effective to prevent fluid communication to second bore portion 39. Accordingly, when the first system brake failure is repaired and upon brake application which exerts equal pressures in first and third bore portions 38, 40, the unequally sized piston portions 51, 52 would be effective to return shuttle-piston 50 to its centered position. In the prior art arrangement referred to above, the fluid previously existing in the V-shaped clearance would flow into this area and upon repair and reapplication of the brakes, this fluid would become somewhat trapped and pressurized as this clearance attempted to close to prevent the shuttle from recentering itself.

When a decrease in pressure occurs in the second fluid system relative to the first fluid system to a predetermined pressure differential (i.e., a failure in the second brake system), fluid pressure in the first system will shift shuttle-piston 50 to the right, carrying sleeve member 59 therewith, until the end of small diameter piston portion 52 contacts interior base surface 81 of stop-retainer 70 as shown in FIG. 4 and plunger 43 will be retracted to actuate light 32. In the FIG. 4 position, a new clearance defined at 92 exists in the area previously occupied by sleeve member 59. In the prior art device referred to above, trapped fluid in the V-shaped clearance would be drawn into clearance 92, especially so when the first system is pressurized, and upon repair of the second system and reapplication of equal brake pressures, the trapped fluid in clearance 92 which would be somewhat pressurized hinders and possibly prevents shuttle-piston 50 from recentering itself. In accordance with the present invention, first and second seals 63, 64 prevent fluid from entering clearance 92 and second bore portion 39 and thus when pressure is restored in the second system, the larger area of the small diameter piston portion 52 and sleeve member 59 will positively recenter shuttle-piston 50 into its FIG. 1 position.

It has thus been shown that the stepped bore arrangement 36 in combination with first and second seals 63, 64 provides an improved means of supporting shuttle-piston 50 which positively insures in a failsafe manner, recentering of the shuttle piston from its second to its first position. Importantly, the shuttle-piston arrangement is easily assembled into failure warning device 10 by a simplified construction of the device. That is, the device is assembled by simply inserting the shuttle-piston arrangement through secondary inlet port 18 into central bore 36 and in this respect, the recessed indentations 45, 46 prevent damage to the first seal 63. The unique stop-retainer member 70 is then inserted and when flared tubing insert 68 is pressed into position, stop-retainer member 70 automatically centers itself by flutes 78 and indentation 80 into a fixed position.

The invention has thus been described with reference to a preferred embodiment. It is apparent that modifications and alterations will occur to others upon a reading and understanding of the specification. It is my intention to include all such modifications and alterations insofar as they come within the scope of the present invention.

It is thus the essence of the invention to provide a simplified failure warning device employing a shuttle-piston supported and sealed in an approved manner to assure a positive, failsafe operation of the device.

Having thus defined the invention, I claim:

1. A failure warning device for indicating a pressure differential between first and second fluid-pressurized systems, said device comprising:

a housing;

a cylindrically stepped bore within said housing;

said bore having a first portion at one end thereof, a second intermediate portion larger than said first portion, and a third portion larger than said second portion at the opposite end of said bore, said first portion in fluid communication with said first fluid-pressurized system, said third bore portion in fluid communication with said second fluid-pressurized system;

a cylindrically stepped shuttle-piston within said bore, said piston having a large diameter portion disposed within said first bore portion and a smaller diameter portion within said third bore portion;

a reset sleeve member receiving said small diameter piston portion and disposed within said third bore portion, said sleeve having an axial end positioned at the juncture of said second and third bore portions and at the juncture of said first and second piston portions when said fluid-pressurized systems are at approximately equal pressures to maintain said piston in a centered position within said bore;

a first seal between said large diameter piston portion and said first bore portion preventing fluid communication from said first bore portion to said second bore portion independent of the axial position of said piston within said bore;

a second seal within said third bore portion at the opposite axial end of said sleeve preventing fluid communication between said third bore portion and said second bore portion independent of the axial position of said piston within said bore;

signal means associated with said piston and extending within said second bore sensing axial displacement of said piston within said bore to actuate a signal device in response to said axial displacement;

said device further includes stop means limiting displacement of said piston in one axial direction within said bore when failure occurs in said second brake system;

said stop means including an inlet port in said housing in fluid communication with said second system and axially aligned with and at the end of said third bore portion, an outlet port in said housing angularly disposed from said inlet port and a cylindrically-hollowed, open-ended retainer disposed within said third bore between said inlet and outlet ports; and said retainer having a base surface with an opening therethrough at one of its axial end faces abutting a stop defined by said inlet port, said smaller diameter piston always extending within said retainer with the retainer length such that the interior of said base surface is in engagement with the end of said smaller diameter piston portion when said piston is axially shifted in one direction upon failure in pressure of said second system, and a plurality of flutes formed about the exterior of said retainer for supporting said retainer in said bore while defining a plurality of longitudinally-extending slots permitting unimpeded fluid communication between said outlet port and said third bore, the other axial end face defined as an annulus and effective to maintain said first seal undeformed about said smaller diameter piston portion and within said third bore upon failure in pressure of said second system.

* * * * *